(12) United States Patent
Chauncey et al.

(10) Patent No.: US 8,924,138 B2
(45) Date of Patent: Dec. 30, 2014

(54) SYSTEM AND METHOD FOR MEASURING AND REDUCING VEHICLE FUEL WASTE

(75) Inventors: David Charles Chauncey, Fairport, NY (US); Edward Charles McCarthy, Pittsford, NY (US); Peter Joseph Roth, Fairport, NY (US); Nicholas Allen Elliott, Pittsford, NY (US)

(73) Assignee: Vnomics Corp., Pittsford, NY (US)

( * ) Notice: Subject to any disclaimer, the term of this patent is extended or adjusted under 35 U.S.C. 154(b) by 0 days.

(21) Appl. No.: 13/313,403

(22) Filed: Dec. 7, 2011

(65) Prior Publication Data

US 2012/0143449 A1 Jun. 7, 2012

Related U.S. Application Data

(60) Provisional application No. 61/420,556, filed on Dec. 7, 2010.

(51) Int. Cl.
| | |
|---|---|
| G06F 19/00 | (2011.01) |
| B60W 40/09 | (2012.01) |
| B60W 50/14 | (2012.01) |
| G01F 9/00 | (2006.01) |
| B60R 16/023 | (2006.01) |
| G01F 9/02 | (2006.01) |

(52) U.S. Cl.
CPC .............. B60W 40/09 (2013.01); B60W 50/14 (2013.01); G01F 9/00 (2013.01); B60R 16/0236 (2013.01); G01F 9/023 (2013.01); B60W 2510/0638 (2013.01); B60W 2520/10 (2013.01); B60W 2540/16 (2013.01); B60W 2540/165 (2013.01)
USPC ................... 701/123; 701/1; 701/51; 702/182

(58) Field of Classification Search
CPC ..... B60W 40/00; B60W 40/08; B60W 40/09; G07C 5/00; G06G 7/70
USPC ........ 701/51, 123, 29.3; 706/1, 2; 702/1, 108, 702/176, 182; 235/375–377, 384; 340/438, 340/450.2
See application file for complete search history.

(56) References Cited

U.S. PATENT DOCUMENTS

| | | | | |
|---|---|---|---|---|
| 4,247,757 A | * | 1/1981 | Crump, Jr. | .................... 235/61 J |
| 5,089,963 A | * | 2/1992 | Takahashi | ........................ 706/23 |

(Continued)

FOREIGN PATENT DOCUMENTS

| | | |
|---|---|---|
| EP | 1498297 A1 | 1/2005 |
| EP | 1780393 A1 | 5/2007 |
| GB | 2470147 | 11/2010 |

OTHER PUBLICATIONS

International Search Report and Written Opinion issued in corresponding PCT/US2011/063663 on Jun. 11, 2012.

*Primary Examiner* — Thomas Tarcza
*Assistant Examiner* — Tyler J Lee
(74) *Attorney, Agent, or Firm* — RatnerPrestia (57) ABSTRACT

One way to improve fuel efficiency of a vehicle is to improve the usage of various gears. One way to measure the amount of fuel wasted due to suboptimal gear shifting is to compare the actual gear used for various driving conditions with the optimal gear used. Such comparisons may be combined with determinations of amount of fuel used to determine how much fuel has been lost due to suboptimal shifting. These techniques are applicable to tracking employment of other driving best practices as well.

17 Claims, 5 Drawing Sheets

(56) References Cited

U.S. PATENT DOCUMENTS

| | | | |
|---|---|---|---|
| 5,315,977 A * | 5/1994 | Fosseen | 123/357 |
| 6,092,021 A * | 7/2000 | Ehlbeck et al. | 701/123 |
| 6,208,981 B1 | 3/2001 | Graf et al. | |
| 6,571,168 B1 * | 5/2003 | Murphy et al. | 701/123 |
| 7,386,389 B2 * | 6/2008 | Stolle et al. | 701/106 |
| 7,925,426 B2 * | 4/2011 | Koebler et al. | 701/123 |
| 8,055,439 B2 * | 11/2011 | Ji et al. | 701/123 |
| 8,224,561 B2 * | 7/2012 | Kim et al. | 701/123 |
| 8,498,818 B1 * | 7/2013 | Jones et al. | 702/1 |
| 8,793,064 B2 * | 7/2014 | Green et al. | 701/123 |
| 2008/0133121 A1 * | 6/2008 | Sato | 701/123 |
| 2009/0109022 A1 * | 4/2009 | Gangopadhyay et al. | 340/540 |
| 2009/0157290 A1 * | 6/2009 | Ji et al. | 701/123 |
| 2009/0281715 A1 * | 11/2009 | Paik | 701/123 |
| 2010/0265052 A1 * | 10/2010 | Koen | 340/438 |
| 2010/0305819 A1 * | 12/2010 | Pihlajamaki | 701/51 |
| 2011/0145042 A1 * | 6/2011 | Green et al. | 705/14.1 |
| 2011/0205040 A1 * | 8/2011 | Van Wiemeersch et al. | 340/426.1 |
| 2013/0096895 A1 * | 4/2013 | Willard et al. | 703/8 |

* cited by examiner

SYSTEM AND METHOD FOR MEASURING AND REDUCING VEHICLE FUEL WASTE

CROSS REFERENCE TO RELATED APPLICATIONS

This application claims the benefit of the filing date of U.S. Provisional App. Ser. No. 61/420,556 filed on Dec. 7, 2010, the disclosure of which is herein incorporated by reference for the purposes of enablement.

FIELD

This invention relates to improving the fuel efficiency of vehicles.

BACKGROUND

Improving fuel efficiency of a variety of vehicles continues to be an important challenge, especially given the role of fossil fuels in both climate change and international relations. Many approaches to different fuels, e.g., biodiesel and electric cars, have been proposed, as have many different engine designs. One previously overlooked area of research is improving the operation of existing vehicles.

SUMMARY

Systems and methods disclosed herein monitor the operation of a vehicle to measure the amount of fuel used, and to determine the portion of the fuel wasted (wherein in wasted generally refers to the amount of fuel consumed above a particular threshold, such as the amount of fuel used according to best practices). While the vehicle is operated, fuel use may be attributed to one of several categories that correspond to operation of the vehicle. By comparing the amount of fuel used with the amount of fuel wasted, the minimum amount of fuel that the operator might have used can be determined. The results of this monitoring may be presented to the operator to improve performance. In addition, the results may be provided to the operator's supervisor for use in tracking operator performance, providing training to the operator, and/or reconfiguring the vehicle.

The disclosed embodiments include an on-vehicle system for monitoring fuel-use. The system might include one or more sensors, a processor and a data storage device that stores program instructions and information which, when executed by the processor, configures the system to attribute the fuel used to one of a plurality of fuel-use categories within respective time frames, wherein the categories include a plurality of wasted fuel categories and at least one non-wasted fuel category. The system determines the minimum amount of fuel required for a sequence of the time frames based on the amount fuel attributed to the wasted categories and the amount of fuel used attributed to the non-wasted categories.

Other embodiments include a method for monitoring the fuel use of a vehicle. The method may include attributing the fuel used by the vehicle to one of a plurality of fuel-use categories within a respective plurality of time frames, wherein the categories include a plurality of wasted fuel categories and at least one non-wasted fuel category and determining the minimum amount of fuel required based on the amount fuel attributed to the wasted categories and the amount of fuel used attributed to the non-wasted categories.

The wasted fuel categories may include, for example, high idle, excessive idle, excessive speed, gearing, progressive-low shifting and progressive-high shifting.

DETAILED DESCRIPTION

Exemplary embodiments disclosed herein measure the fuel used by the operator of a vehicle during a sortie and determine the amount of fuel wasted. The vehicle may be any type of transport having an operator (e.g., a driver or a pilot), an engine (e.g., a piston engine, a diesel engine, a rotary engine, an electric motor, or a turbine engine) and a gearing that propels the vehicle by consuming fuel. The vehicle may be, for example, a ground vehicle (e.g., gasoline or hybrid), watercraft, aircraft, a model vehicle (e.g., remote controlled car) that may be used to transport passengers, mail and/or freight, sensors or for pleasure.

Fuel is any energy source that the engine consumes to propel the vehicle and operate its auxiliary equipment. Generally, the fuel used by the vehicle is a combustible material, such as gasoline, kerosene, diesel fuel, hydrogen, natural gas and/or ethanol. The disclosure, however, is not limited to such exemplary embodiments. The fuel can be a combustible, chemical, electrochemical, biological, solar, photovoltaic, nuclear, kinetic, and potential energy source.

The operator is an individual that controls the vehicle during a sortie and whose behavior affects the amount of fuel consumed by the vehicle. Ideally, an operator would not waste any fuel. That is, the operator would use the minimum amount of fuel necessary during the sortie. However, during a sortie, an operator may waste fuel due to poor driving technique (e.g., changing gears at the wrong time or traveling at excessive speeds), excessive idling (e.g., failing to turn the vehicle off during long stops) or high-idling (e.g., using the vehicle to run auxiliary equipment). Also, fuel may be wasted if the vehicle is not properly configured, such as in the case where a vehicle is setup for making heavy haul deliveries performs a sortie requiring a large number of light deliveries in stop-and-go conditions.

In terms of this disclosure a "sortie" is the period between the start of a trip at an origin location and the end of the trip at a destination location by a particular vehicle. The "start" and the "end" of a sortie may correspond to an operator-input, a time event and/or a position event. For instance, an operator-input event may be a command input (e.g., a pushbutton) from the operator of the vehicle. Time events may include all the activities of the vehicle within a time period (e.g., 7:00 AM to 7:00 PM). Position events may define the start of a sortie when a vehicle embarks from a first location (e.g., a start line) and/or at the end of a sortie when the vehicle arrives at a second location (e.g., a finish line). The first and second locations may be the same as where the vehicle completes a round-trip.

Figure 1:
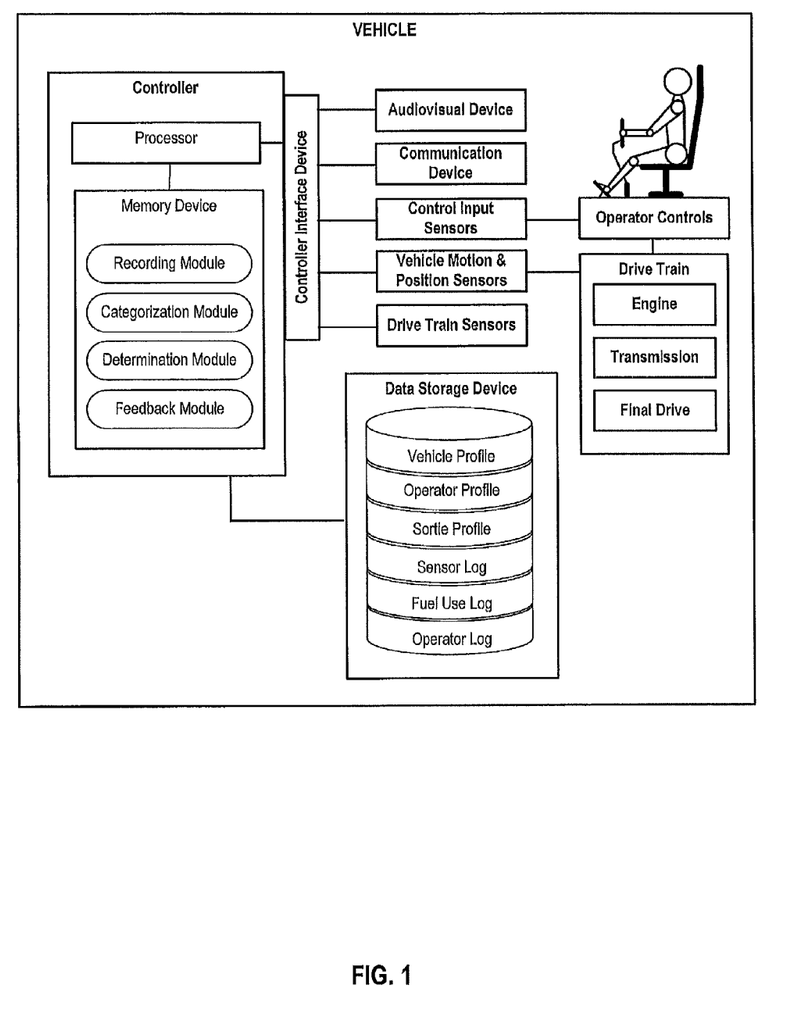
FIG. 1 is a block diagram illustrating an exemplary system.

FIG. 1 is a block diagram illustrating an exemplary vehicle in which embodiments consistent with the present disclosure may be implemented. The vehicle may include operator controls, a drive train, sensor devices, an audiovisual device and a communication device.

The operator controls are components of the vehicle that receive inputs from the operator that affect the vehicle's fuel consumption. The operator's controls may include, for example, steering inputs (e.g., steering wheel, stick, yoke), breaking inputs, trim inputs, throttle inputs and transmission inputs (e.g. gear selection).

The drive train includes vehicle components that transform fuel into kinetic energy to propel the vehicle. The drive train may include an engine, a transmission, and a final drive (e.g., drive wheels, continuous tracks, propeller, etc.).

Sensors are devices that measure or detect real-world conditions and convert the detected conditions into analog and/or digital information that may be stored, retrieved and processed. As shown in FIG. 1, the vehicle's sensors include control input sensors, vehicle position/motion sensors, and drive train sensors. The control input sensors detect and/or measure changes in the state of the control input devices.

The vehicle motion/position sensors detect and/or measure the vehicle's position, orientation, velocity, acceleration and changes in the state thereof. The motion/position sensors may include accelerometers that measure acceleration (translational or angular). Based on the vehicle's acceleration in any direction over time, its speed and position can be derived. In some embodiments, some or all of the motion/position sensors are provided by an inertial measurement unit (IMU), which is an electronic device that measures and reports on a vehicle's velocity, orientation and gravitational forces, using a combination of accelerometers and gyroscopes without the need for external references. Additionally, the motion/position sensors may be provided by a global positioning system (GPS) navigation device. GPS devices provide latitude and longitude information, and may also calculate directional velocity and altitude. The vehicle may also include speed sensors that detect the speed of the vehicle. Based on the speed, the sensor may also detect the distance traveled by the vehicle (e.g., odometer). Additionally or alternatively, wheel speed sensors may be located on the wheels, the vehicle's differential, or a pilot tube may measure the velocity of air with respect to the motion of the vehicle.

The drive train sensors include devices that determine operating parameters of the engine and transmission. For example, the drive train sensors may detect engine speed (e.g., RPM), air flow, fuel flow, oxygen and idle speed. Based on this information, the vehicle's fuel consumption may be determined at any given time.

The audiovisual device generates visual and aural cues to present the operator with feedback, and coaching. The audiovisual device may include a video display, such as a liquid crystal display, plasma display, cathode ray tube, and the like. The audiovisual device may include an audio transducer, such as a speaker. Furthermore, the audiovisual display may include one or more operator-input devices, such as bezel keys, a touch screen display, a mouse, a keyboard and/or a microphone for a voice-recognition unit. Using the audiovisual device, information obtained from the vehicle's sensors may be used to provide feedback to the operator indicating driving actions that should have been taken or avoided to optimize fuel consumption by the vehicle.

The communication device sends and/or receives information from the vehicle over one or more communication channels to other vehicles, a remote supervisor, and/or a remote server (not shown). The communication device may provide, for example, information collected by the sensors and reports generated by the fuel tracking system describing fuel use, fuel wasted, operator performance and vehicle performance to a back-office server (not shown).

The communication device may use wired, fixed wireless, or mobile wireless information networks that communicate a variety of protocols. The networks may comprise any wireless network, wireline network or a combination of wireless and wireline networks capable of supporting communication by the vehicle using ground-based and/or space-based components. The network can be, for instance, an ad-hoc wireless communications network, a satellite network, a data network, a public switched telephone network (PSTN), an integrated services digital network (ISDN), a local area network (LAN), a wide area network (WAN), a metropolitan area network (MAN), all or a portion of the Internet, and/or other communication systems or combination of communication systems at one or more locations. The network can also be connected to another network, contain one or more other sub-networks, and/or be a sub-network within another network.

The controller may be one or more devices that exchange information with the sensors, the memory device, the data storage device, the audiovisual device and/or the communication device. The controller includes a processor and a memory device. The processor may be a general-purpose processor (e.g., INTEL or IBM), or a specialized, embedded processor (e.g., ARM). The memory device may be a random access memory ("RAM"), a read-only memory ("ROM"), a FLASH memory, or the like. Although the memory device is depicted as a single medium, the device may comprise additional storage media devices.

In some embodiments, the controller is a stand-alone system that functions in parallel with other information processing devices (e.g., a mission computer, engine control unit or cockpit information unit) operating on the vehicle. In other embodiments, the functions of the controller may be incorporated within one or more other information processing devices on the vehicle.

The controller processes the received information to determine the amount of fuel required for the vehicle during a sortie, and the amount of fuel wasted during the sortie. The determinations made by the controller may be output via the audiovisual device to provide feedback and/or operator coaching. In addition, the determinations may be reported to a supervisor or a back-office server via the communication device.

The data storage device may be one or more devices that store and retrieve information, including computer-readable program instructions and data. The data storage device may be, for instance, a semiconductor, a magnetic or an optical-based information storage/retrieval device (e.g., flash memory, hard disk drive, CD-ROM, or flash RAM).

The controller interface device may be one or more devices for exchanging information between the host and the devices on the vehicle. The controller interface device may include devices operable to perform analog-to-digital conversion, digital-to-analog conversion, filtering, switching, relaying, amplification and/or attenuation. Furthermore, the controller interface device may store the received information for access by the processor. In some embodiments, the data interface includes a diagnostic data port, such as a J1708/J1939 bus interface as described in the Society of Automotive Engineers SAE International Surface Vehicle Recommended Practice.

The computer-readable program instructions may be recorded on the data storage device and/or the memory device. As shown in FIG. 1, the instructions include a recording module, a categorization module, a determination module and a feedback module. The recording module configures the controller to obtain information provided to the controller by the sensors and stores the sensor information in the data storage device. The categorization module configures the controller to categorize the amount of fuel used during the sortie based on information received from the sensors and control inputs. The determination module obtains information from the fuel-use log and determines the amount of fuel used during the sortie, the amount of fuel wasted, and the minimum amount of fuel required to complete the sortie.

The data stored on the data storage device includes a vehicle profile, an operator profile, and/or a sortie profile. The vehicle profile includes information describing the configuration and predetermined limits of the vehicle. For instance, the vehicle profile may include a vehicle identifier, a vehicle type, a make, a model, vehicle options, vehicle age, defects, maintenance history and predetermined limitations (e.g., road speed limit). In addition, the vehicle profile may store information about the engine, such as the engine type, size, power, power curve and idle speed. Also, the vehicle profile may store information about the transmission, such as gear ratios, threshold speeds, optimal engine speed for the gears in the transmission, and/or a map of the ideal shift patterns for the transmission. The operator profile stores information describing the operator including identification information, experience information, skill-rating information, performance information and goal information.

The sortie profile stores information corresponding to a sortie. The sortie profile information may include a sortie type, a sortie description and a load description. In addition, the sortie profile may include thresholds corresponding to the sortie, such as speed, distance, time, stops and load. Furthermore, the sortie type may include information describing the sortie, including, the environment of the sortie (e.g., urban, suburban, rural, long-haul, combat, enforcement, patrol, or training) along with corresponding performance thresholds. In addition, the sortie description may include a predefined route, waypoints and schedules for the sortie. A load type may include, for example, descriptors of the load including size, weight, scheduled delivery time, fragility and/or hazardous material identifiers.

The data storage device may store logs of information generated during the sortie. This information may include a sensor log, a fuel-use log and an operator log. The sensor log receives information from the sensors and stores the information in association with a corresponding time frame. A time frame is a block of time that is one of a series that span the duration of the sortie. The length of the time and the rate at which the time frames are recorded may be chosen to provide different levels of detail regarding the vehicle's fuel-use and the operator's performance. In some embodiments, a substantially continuous sequence of fuel-use determinations is recorded in the fuel-use log. For instance, the recording may determine a category of fuel-use for each time frame during the sortie. The time frame may be, for example, 1/60th of second, one-second, ten-seconds, etc. Other embodiments may, for example, make periodic samples. The recording may record a fuel-use determination every ten seconds based on a one-second time frame.

The fuel-use log is a record of the fuel-used by the vehicle during a sortie. As described below, the controller determines the amount of fuel used and the fuel wasted during a sortie. The fuel used and the fuel wasted is determined based on categorizing the fuel used within a number of time frames during the sortie.

Figure 2:
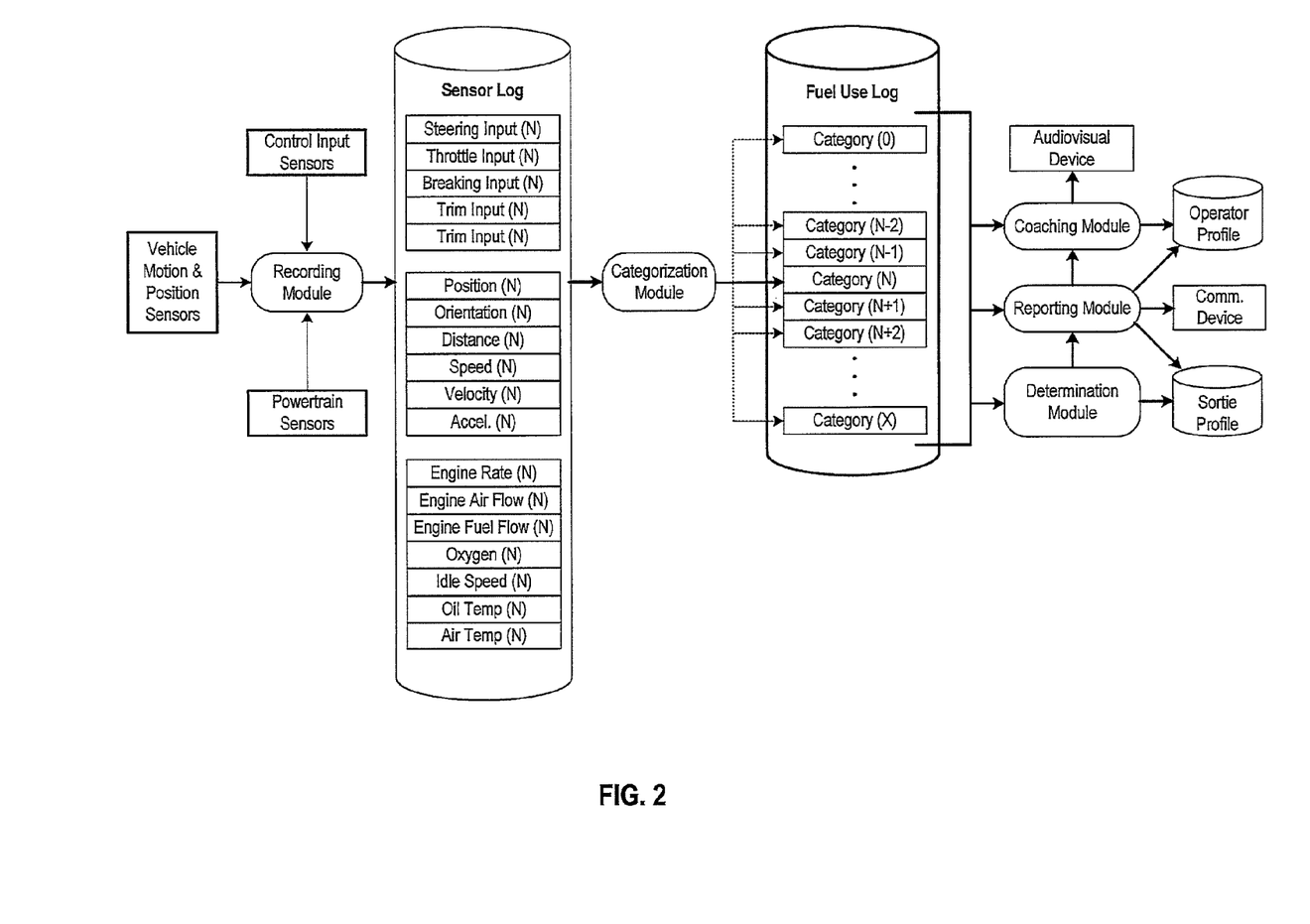
FIG. 2 is a functional diagram of the exemplary system.

FIG. 2 is a functional block diagram of the exemplary vehicle illustrated in FIG. 1. The recording module, when executed by the processor, configures the controller to obtain information from the vehicle's sensors over a time frame (N) and store the sensor information as a record in the sensor log identified to the corresponding time frame (N), where "N" represents a current time frame in a series of time frames [0 . . . N . . . X], where "0" represents the first recorded time frame during the sortie, "N" represents the current time frame, and "X" represents the final time frame recorded at the end of the sortie. For the sake of clarity, FIG. 2 only shows the sensor information recorded for a single, current time frame (N). The same or similar information may be recorded and stored in the sensor log for each time frame 0 to X. In some embodiments, all the sensor information from each time frame may be retained in the sensor log. In other embodiments, a subset of the sensor information is retained. For example, to reduce the size of the data storage device, the sensor log may function as a buffer that stores only the latest several time frames (e.g. N−2, N−1, and N).

The categorization module, when executed by the processor, configures the controller to obtain sensor information stored in the sensor log for a time frame and, based on the sensor information, categorize the fuel used in that time frame into one of a plurality of categories. The category information is stored in the fuel-use log identified with the corresponding time frame (0 . . . N . . . X). As described in detail below with regard to FIG. 3, the categories include a number of categories that identify different wasteful uses of fuel (e.g., high-idle, excessive idle, excessive speed, gearing, or improper progressive shift) and at least one category corresponding to non-wasteful uses of fuel (e.g., normal fuel use or a desired stop).

The determination module, when executed by the processor, configures the controller to determine how much fuel was consumed beyond what would have been used by best practices based on information recorded in the fuel-use log. The cumulative amount of fuel wasted during the sortie may be determined by totaling the fuel categorized as wasted in the time frames 0 to N. Additionally, the fuel wasted over the entire sortie may be determined by totaling the fuel used for each time frame categorized as wasted in the time frames 0 to X. Furthermore, the minimum amount of fuel required during the sortie may be determined by subtracting the cumulative amount of fuel wasted from the cumulative fuel used during the sortie.

The reporting module, when executed by the processor, configures the controller to obtain information from the fuel-use log and/or the determination module to generate a report of the vehicle's and the operator's performance during the sortie. The reporting module may generate a document including the information in the report and provide the information to, for example, the communication device for transmission to the operator's supervisor and/or back office server. The reporting module may also share information with the feedback module.

The feedback module, when executed by the processor, configures the controller to obtain information from the fuel-use log and/or the reporting module. Based on the obtained information, the feedback module may generate visual and aural cues for the operator using the audiovisual device. For instance, the feedback module may generate a shift score that is calculated and displayed to the operator by the audiovisual device and/or transmitted to the operator's supervisor via the communication device. The feedback module may also determine an operator's performance score based on the results generated by the categorization module and the determination module. The score may also be used to compare performance relative to other operators in a group.

Figure 3:
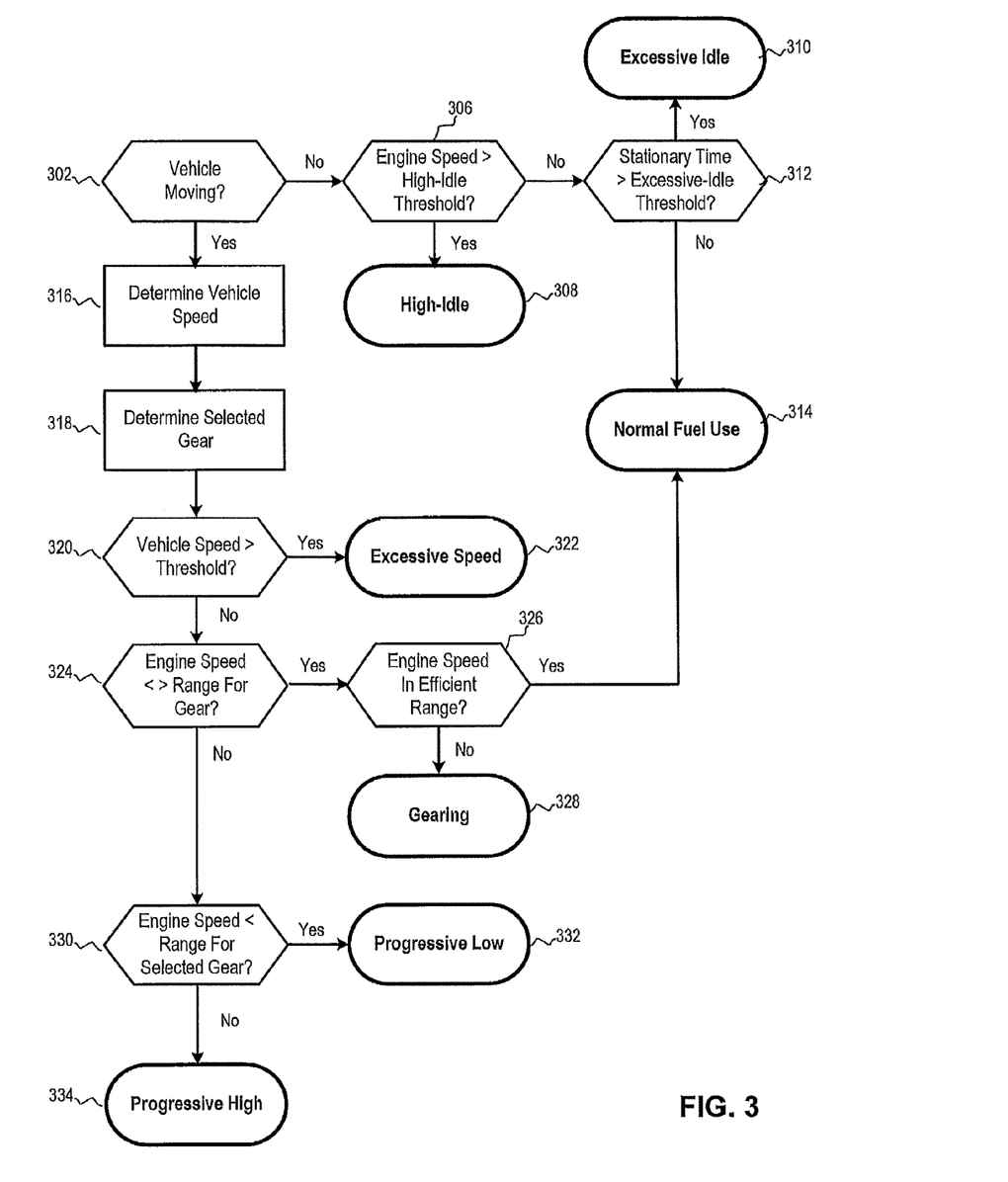
FIG. 3 is a flow chart illustrating an exemplary process of categorizing fuel-use.

FIG. 3 is a flow chart illustrating an exemplary process by which the categorization module categorizes fuel-use. The amount of fuel wasted during the sortie is determined from the categorization of a vehicle's fuel use based on information received from the vehicle's sensors. The categories correspond to conditions of the vehicle caused by the operator and/or vehicle configuration. The categories include excessive idle, high idle, gearing, improper gear selection (e.g., high/low progressive shifting) and excessive speed. By determining the amount of fuel allocated to these categories during and/or after a sortie, the system may determine the least amount of fuel required during the sortie. Based on this, a fleet manager may determine the operating cost of the fuel for a sortie absent any waste. Additionally, the fleet manager and/or the cost of his operators' inefficient behaviors.

Figure 4:
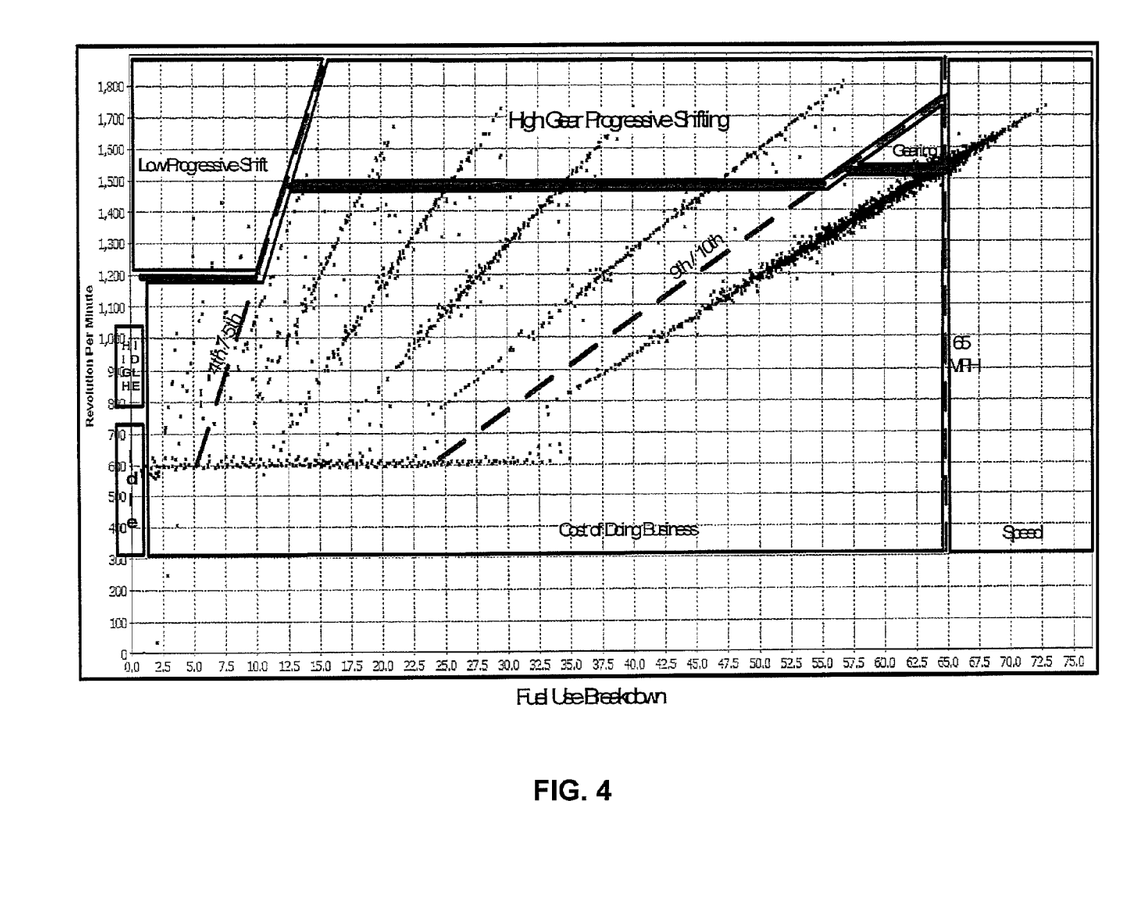
FIG. 4 is a line graph of engine speed versus vehicle speed and the corresponding fuel-use categories for different transmission selections in an exemplary vehicle.

"High-idle" is a category of fuel-use in which fuel is consumed while the vehicle is stationary (e.g., based on GPS, speed, INS) and the engine speed is above a predetermined high-idle threshold (e.g., 800 RPM). The sensing of the power takeoff engagement my be an actual indicator signal rather than just an increase in RPM. (See, e.g., FIG. 4, "High Idle.") The categorization module may allocate fuel to the high-idle category when, for example, the operator powers auxiliary equipment using the vehicle's engine. The amount of fuel allocated to this category may be determined by monitoring fuel flow rate within each time frame corresponding to the high-idle category. In some embodiments, the fuel used during high idle is computed by integrating fuel rate FR during high idles for each of the $N_{high}$ high idles $$F_{highIdle} = \sum_{j=1}^{N_{high}} \int_{t_{hs}^j}^{t_{he}^j} FR(t)dt$$

where $t_{hs}^j$ and $t_{he}^j$ denote start time and end time of the $j^{th}$ time frame, respectively.

"Excessive idle" is a category of fuel-use in which fuel is wasted while the vehicle is stationary, the engine speed is below the high-idle threshold but the vehicle has been stationary for a continuous span of time that is longer than an excessive-idle time threshold. The excessive idle category measures fuel wasted by the operator by, for example, leaving the vehicle's engine running to operate auxiliary equipment. The amount of wasted fuel attributed to excessive idle may be increased based on information indicating additional wasteful operations. For instance, some vehicles may be equipped with an "auto-shutoff" feature that stops the engine after the vehicle idles for a predetermined amount of time. In cases where the auto-shutoff feature malfunctions or is disabled, all the fuel that is used after the predetermined time for the auto-shutoff to trigger may be attributed to the excessive idle category.

In some embodiments, the amount fuel wasted for excessive idle may be determine using the following algorithm:

$$F_{PS} = \max\left(\frac{\sum_{k=1}^{N_{long}}(\Delta t_{longIdle}^k - 5\text{ min})}{\sum_{i=1}^{N} \Delta t^i} F_{total} - F_{highIdle}, 0\right)$$

where:
$F_{total}$ is total fuel consumed,
$\Delta t_{longIdle}^k$ is the duration of the $k^{th}$ long idle,
$N_{long}$ is the number of long idles,
$\Delta t^i$ is the duration of the $i^{th}$ idle,
$N$ is the number of all idles, and
$F_{highIdle}$ is integrated fuel during the high idles.

In addition, the amount of fuel attributed to the excessive idle category may be reduced based on information indicating non-wasteful operations while idling during short stops (e.g., delivery stop, stop light) or operating auxiliary equipment. In the case of short stops, the duration of idling used to screen out stops for deliveries/pickups, stops for traffic signals, and initial engine warm up. The fuel used in these cases can then be attributed appropriately to the "normal fuel use" category. In certain embodiments, high idle should not be classified as wasted fuel as this is fuel used for running auxiliary devices.

"Progressive Shifting—Low" and "Progressive Shifting—High" are categories of fuel-use in which fuel is wasted by an operator who has selected an improper gear for the vehicle's speed. Progressive shifting is a technique for changing gears that reduces fuel consumption. The operator "progressively shifts" by changing gears upward as early as possible when accelerating. After each shift is completed, the engine and transmission should be operating at or near the lowest speed (e.g., RPM) recommended for the transmission by, for example, the manufacturer.

Shifting as early as possible may be preferable where an engine's torque and horse power curves are correlated, as is the case for certain diesel engines. Newer, more efficient diesel engines may have peak torque occur at a much lower RPM. These engines may have torque bands that are flat over a well-defined range and there could be a significant loss in torque and fuel efficiency if a driver allows the engine RPM to exceed the critical thresholds beyond these bands.

In certain embodiments, a system may be configured to maximize torque while minimizing fuel consumption. In situations where the desired RPM is within the OEM specified peak torque band of more than one gear, a system may set the gear with the highest torque, lowest fuel consumption or a combination thereof as optimal.

If there are two available gears, often the higher gear (perhaps by count rather than ratio) provides the most fuel efficient speed at which to operate the engine. Normally the "ideal shift," i.e., the shift that occurs exactly when the next higher gear would allow the engine speed to just exceed the lower manufacturing threshold, ensures that the engine is operated at the lowest possible speed that can maintain the desired torque while operating in the most fuel efficient manner. In one embodiment, an on-board computer may automatically determine this point for each of the gears customized for a particular truck (as determined by the gear setup/transmission/engine combination) and then uses that information to calculate the fuel lost when this shift point is not hit exactly. As with other algorithms disclosed herein, the difference in fuel flow rates between the higher gear and the lower gear over the time-period in which the driver remains in the wrong gear can be used in order to determine the total amount of fuel wasted (or potentially wasted).

In certain embodiments, the calculation of which gear is optimal may be done in software (e.g., on an on-board computer or in a remote server) such that as recommended gearings change, perhaps due to new engine designs, the calculations may be adjusted with reduced cost.

In certain embodiments, there may be gradations of the wrong gear being used. For example, a driver (and/or their supervisor) may be notified that the driver shifted "late" rather than "very late." In another example, there may be three levels to differentiate how chronologically early the shifting occurred, e.g., a little early, early and very early.

The categorization module allocates the fuel used to the low/high progressive shifting categories when the vehicle is moving, the vehicle's speed is less than an excessive speed threshold and the engine speed for the selected gear is outside the predetermined range. (See, e.g., FIG. 4, "Low-Progressive Shift" and "High Gear Progressive Shifting.") If the categorization module determines that the current gear selection satisfies the requirements for low/high progressive shifting, the module determines the amount of fuel wasted from the difference between the current fuel-flow rate and an average baseline fuel flow rate. The average rate may be accumulated based on the vehicle's current operating conditions (including, weight, road, and terrain conditions). Alternatively, the average rate may be determined based on an initial, engine-specific fuel flow rates.

For determining the amount of fuel wasted due to low/high progressive shifting, the following algorithm may be used:

```
Parameters:
    θ_low—threshold in the low LR region
    θ_high—threshold in the high LR region
    LR—critical v/ω value that separates the low range from the
        high range
    S_L—saving factor in the low range
    S_H—saving factor in the high range
Inputs:
    v—vehicle wheel-based speed
    ω—engine speed
    F_R—fuel rate
Outputs:
    f_SL—fuel saved in the low range
    f_SH—fuel saved in the high range
f_SL ← 0
f_SH ← 0
LOOP through v, ω, and FR
    IF v/ω < LR AND > θ_low
        f_SL ← f_SL + (FR×S_L) dt
    ELSEIF v/ω > LR AND > θ_high
        f_SH ← f_SH + (FR×S_H) dt
    END-IF
END-LOOP
```

The above algorithm may be preferable where an engine's torque and horse power curves are correlated. As noted above, this algorithm may be modified based on the performance characteristics of a given engine.

"Gearing" is a fuel-use category in which fuel is wasted as a result of the vehicle's transmission being improperly configured for the weight, speed and/or terrain of the sortie. Detecting such improper gearing allows the vehicle's setup to be optimized the fuel performance for the sortie profile, resulting in an overall reduction in fuel usage. The categorization module attributes an amount of fuel in the current time period used to the gearing category when the vehicle is moving, the engine is operating in the appropriate speed range based on predetermined speed thresholds, but the engine speed exceeds a predetermined rate that provides maximum fuel efficiency at a cruise speed. (See, e.g., FIG. 4, "Gearing.")

"Excessive speeding" is a fuel-use category in which the operator wastes fuel by operating the vehicle at a speed that exceeds a predetermined threshold top fleet speed limit (See, e.g., FIG. 4, "65 MPH.") The amount of fuel allocated by the categorization module to the excessive speeding category is determined by first calculating the current fuel flow. This value may be compared with the fuel flow for a vehicle operating at the top fleet speed. If the fuel flow while speeding exceeds the top speed value, the categorization module accumulates the wasted fuel by determining the fuel flow difference. The categorization module may normalize the fuel calculated for current weight, road and terrain conditions in order to more accurately determine how much fuel is being wasted.

Exemplary conditions may include light rain, heavy rain, sunny, snowing, high winds, icy roads, darkness and other weather related situations. Exemplary conditions may also include flat straightaway, twisting roads, heavy merging, tangled intersections, uphill, steep uphill, a particular grade of uphill (e.g., 21 degrees), downhill, steep downhill, a particular grade of downhill (e.g., 19 degrees), blind corner or other traffic configurations. Exemplary conditions may further include positive or negative combinations of conditions, e.g., darkness, icy roads but no merging.

In certain embodiments, operating conditions may be sensed in real time (e.g., with weather detection equipment). In certain embodiments, operating conditions may be gathered independent of the vehicle (e.g., from a weather report). In certain embodiments, operating conditions may be gathered before or after operation (e.g., by checking a street map to detect intersections).

"Normal fuel use" is a fuel-use category in which fuel is not wasted. (See, e.g., FIG. 4, "Cost of Doing Business.") During normal operation, a minimum amount of fuel required to propel or operate the vehicle (including all necessary ancillary activities, such as auxiliary equipment usage) is consumed. The amount of fuel required during normal operation of the vehicle may take into account the vehicle's weight, its route, and the terrain. Fuel is wasted due to operator activities or behaviors that can be reduced or eliminated. It should be noted that activates or behaviors that might be unavoidable during a particular sortie may be considered wasteful. For instance, an operator may unavoidably waste use fuel to idle a vehicle during a severe traffic jam.

As noted above, FIG. 3 provides a flow chart illustrating an exemplary process performed by the categorization module. The module determines whether the vehicle is moving. (Step 302) This determination may be made based on information received from the vehicle motion & position sensors (e.g., accelerometer, INS, GPS).

If the vehicle is not moving (step 302, "No"), the categorization module determines whether the engine speed is below the high-idle threshold value (step 306) using information received from the drive train sensors (e.g., tachometer). If the engine speed is greater than the high-idle threshold (step 306, "Yes"), the categorization module stores the fuel wasted due to high-idling in the fuel use log in association with the current time frame (step 308). The amount of fuel wasted may be determined based on the difference between the measured fuel flow at the engine speed during the current time frame and the fuel flow rate at the high-idle threshold. The fuel flow rate at the high-idle threshold may be determined based on engine speed information stored in the sensor log, or it may be determined based on a predetermined fuel flow rate stored in the vehicle profile.

If the vehicle is not moving (step 302, "No"), and the engine speed is not greater than the high-idle threshold value (step 306, "No"), the categorization module determines whether the vehicle has been stationary for a continuous period of time that exceeds the excessive-idle threshold value (step 312). If not (step 312, "No"), the categorization module records the fuel used during the current time frame in the current time frame as normal fuel-use (step 314). Otherwise, if the vehicle has been stationary for a continuous period of time that exceeds the excessive-idle threshold value (step 312, "Yes"), the categorization module records any amount of fuel used for the time period exceeding the excessive-idle threshold in the category of "excessive idle" (step 310).

If the categorization module determines that the vehicle is moving (step 302, "Yes"), the module determines the vehicle's speed (step 316) and the selected gear of the transmission (step 318), based on information received from the vehicle motion and position sensors and the drive train sensors. If the vehicle's speed is greater than a predetermined speed threshold value (step 320, "Yes"), the fuel used during the time frame is attributed to the excessive speed category in the fuel-use log (step 322).

If the vehicle's speed is not greater than the predetermined speed threshold value (step 320, "No"), the categorization module determines whether the engine speed is outside a predetermined range for the selected gear (step 330). If the engine speed is within the predetermined range for the selected gear (step 324, "Yes"), the categorization module determines whether the engine speed is in a predetermined fuel-efficient range for the selected gear (step 326). If so, the categorization module attributes the fuel used during the current time frame as "normal fuel use" (step 314) and stores fuel used in the fuel-use log in association with the attributed category. On the other hand, if the engine speed is not in the fuel-efficient range for the selected gear (step 326, "No"), the module attributes the amount of fuel used that is outside the efficient range to the gearing category and records the determination in the fuel-use log (step 328).

If the engine speed is outside the predetermined range for the selected gear (step 324, "No"), the categorization module determines whether the engine speed is outside the predetermined speed range for the selected gear. If so (step 330, "Yes"), the module attributes the fuel used in the time frame to the progressive low category (step 332). If the categorization module determines that the engine speed is not below (i.e., above) the speed range for the selected gear (step 330, "No"), the module attributes the fuel used in the time frame to the progressive high category (step 334).

By accurately calculating the above-described categories of fuel-use and overall fuel usage, the determining module may determine the minimum amount of fuel needed to complete a particular sortie considering the weight, route, terrain, a perfectly geared vehicle and speed thresholds. Doing so allows a determination of the fuel and cost could be saved if the vehicle was operated in its most efficient manner.

Figure 5:
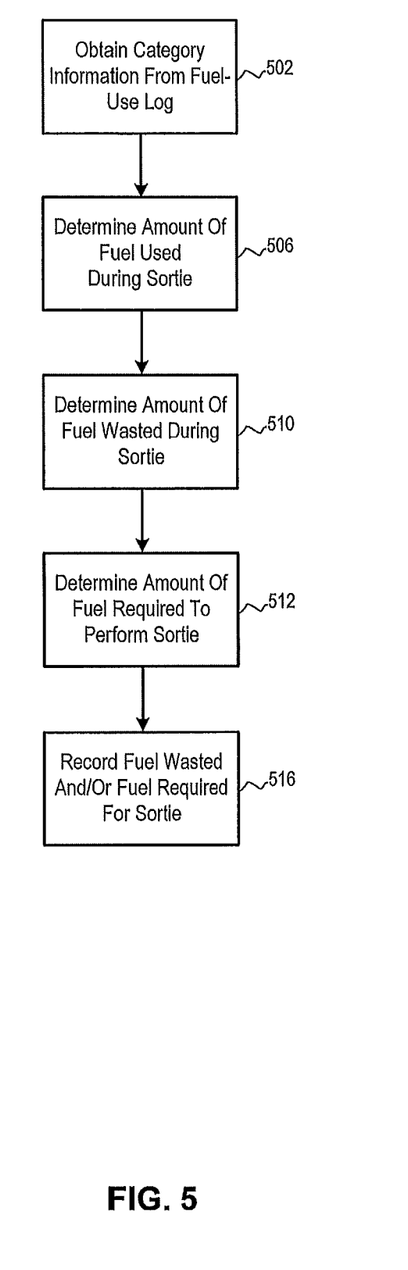
FIG. 5 is a flow chart illustrating an exemplary process of determining fuel used and fuel wasted.

FIG. 5 illustrates a flow diagram of an exemplary process for determining the amount of fuel used and the amount wasted during the sortie. The determination module obtains category information stored in the fuel-use log. (Step 502) As described above with regard to FIG. 3, the fuel-use log includes records associating an amount of fuel used in different time frames with a corresponding category of fuel use. Based on the obtained information, the determination module determines the cumulative amount of fuel used during the sortie. (Step 506) The cumulative amount of fuel used during the sortie corresponding to each of the wasteful fuel-use categories is determined. (Step 510) The determination module obtains the minimum amount of fuel required to perform the sortie by finding the difference between the fuel used during the sortie and the fuel-wasted during to sortie. (Step 512) The amount of fuel required and the amount of fuel wasted may then be recorded and reported. (Step 516)

As disclosed herein, embodiments and features can be implemented through computer hardware and/or software. Other embodiments of the invention will be apparent to those skilled in the art from consideration of the specification and practice of the embodiments of the invention disclosed herein. Further, the steps of the disclosed methods can be modified in any manner, including by reordering steps and/or inserting or deleting steps, without departing from the principles of the invention. It is therefore intended that the specification and embodiments be considered as exemplary only.

The invention claimed is:

1. A system for determining a minimum amount of fuel required for a series of time frames in a sortie, the system comprising:
   at least one sensor configured to detect fuel use information of a vehicle during operation of the vehicle;
   a data storage device; and
   a controller, coupled to the data storage device, the controller comprising:
   a categorization module configured to obtain the fuel use information from the at least one sensor for each time frame in the series of time frames and to categorize the fuel use information for each time frame into either at least one of a plurality of normal fuel use categories or at least one of a plurality of wasted fuel use categories; and
   a determination module configured to subtract a total amount of fuel used during each time frame in the series of time frames where the fuel use information is categorized in the plurality of wasted fuel use categories from a total amount of fuel used over the series of time frames for storage in the data storage device as the minimum amount of fuel required for the series of time frames.

2. The system of claim 1, comprising a global positioning satellite receiver.

3. The system of claim 1, wherein the determination module is further configured to determine an amount of fuel wasted over the series of time frames by subtracting the stored minimum amount of fuel required for the series of time frames from the total amount of fuel used over the series of time frames.

4. The system of claim 3, wherein the series of time frames comprises all time frames in the sortie.

5. The system of claim 3, wherein the data storage device further comprises a sortie profile configured to store sortie information.

6. The system of claim 5, wherein the sortie information comprises at least one of a predefined route, an at least one waypoint, or a schedule for the sortie.

7. The system of claim 5, wherein the series of time frames includes all times frames between a start of the sortie and the at least one waypoint.

8. The system of claim 5, wherein the series of time frames includes all time frames between the at least one waypoint and an end of the sortie.

9. The system of claim 5, wherein the predefined route is determined based on an operating cost of the minimum amount of fuel required for the series of time frames.

10. The system of claim 1, further comprising a feedback module configured to generate cues for an operator of the vehicle.

11. The system of claim 10, wherein the feedback module further comprises an audiovisual device configured to present the cues to the operator of the vehicle.

12. The system of claim 10, wherein the cues indicate driving actions to be taken by the operator of the vehicle to optimize fuel consumption.

13. The system of claim 1, wherein the plurality of wasted fuel categories includes at least one category for fuel wasted while the vehicle is idle.

14. The system of claim 1, wherein the plurality of wasted fuel categories includes at least one category for fuel wasted while the vehicle is in an improper gear.

15. The system of claim 1, wherein the plurality of wasted fuel categories includes at least one category for fuel wasted while the vehicle is in an excessive speed.

16. A system for determining a minimum amount of fuel required for a sortie, the system comprising:

at least one sensor configured to detect fuel use information of a vehicle during operation of the vehicle;

a data storage device; and a controller, coupled to the data storage device, the controller comprising:

a categorization module configured to obtain the fuel use information from the at least one sensor for each of a number of time frames over the sortie and to categorize the fuel use information for each of the time frames into either at least one of a plurality of normal fuel use categories or at least one of a plurality of wasted fuel use categories; and a determination module configured to subtract a total amount of fuel used during each of the number of time frames where the fuel use information is categorized in the plurality of wasted fuel use categories from a total amount of fuel used over the sortie for storage in the data storage device as the minimum amount of fuel required for the sortie.

17. The system of claim 16, wherein the determination module is further configured to determine an amount of fuel wasted over the sortie by subtracting the stored minimum amount of fuel required for the sortie from the total amount of fuel used over the sortie.

* * * * *